United States Patent

Nakagawa et al.

(10) Patent No.: US 10,983,598 B2
(45) Date of Patent: Apr. 20, 2021

(54) ARITHMETIC UNIT

(71) Applicant: Yazaki Corporation, Tokyo (JP)

(72) Inventors: Satoshi Nakagawa, Makinohara (JP); Tomonori Ohashi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/209,464

(22) Filed: Dec. 4, 2018

(65) Prior Publication Data

US 2019/0171614 A1 Jun. 6, 2019

(30) Foreign Application Priority Data

Dec. 5, 2017 (JP) .............................. JP2017-233477

(51) Int. Cl.
*G06F 3/02* (2006.01)
*G06F 7/57* (2006.01)
*G06F 13/00* (2006.01)
*G06F 13/38* (2006.01)
*G06F 15/80* (2006.01)
*G06F 9/22* (2006.01)

(52) U.S. Cl.
CPC .................. *G06F 3/02* (2013.01); *G06F 7/57* (2013.01); *G06F 13/00* (2013.01); *G06F 13/385* (2013.01); *G06F 9/226* (2013.01); *G06F 15/8084* (2013.01)

(58) Field of Classification Search
CPC ... G06F 3/02; G06F 7/57; G06F 9/226; G06F 13/00; G06F 13/38; G06F 13/3382; G06F 13/385; G06F 13/387; G06F 13/40; G06F 13/4004; G06F 13/4022; G06F 13/4063; G06F 13/4068; G06F 15/8084; G06F 13/382
See application file for complete search history.

(56) References Cited

U.S. PATENT DOCUMENTS 4,379,973 A * 4/1983 Turner ................. H01H 1/5805
200/292
5,382,791 A * 1/1995 Leff ..................... G08B 25/016
250/208.4
(Continued)

FOREIGN PATENT DOCUMENTS

JP 02118701 A 5/1990
JP 2015105056 A 6/2015
(Continued)

OTHER PUBLICATIONS

Ishizawa, T. ,et al., "A computing platform for developing an application in real-space", IEICE Technical Report, vol. 106, No. 44, MoMuC2006—May 2, 2006, pp. 7-12.
(Continued)

*Primary Examiner* — Thomas J. Cleary

(74) *Attorney, Agent, or Firm* — Sughrue Mion, PLLC

(57) ABSTRACT

Provided is an arithmetic processing to reduce a number of parts as it is not necessary to prepare an operation device for each input processing logic. A plurality of types of input processing logics is stored in the ROM, and CPU selects one of the plurality of types of input processing logics and executes input processing according to the selected input processing logic. As a result, there is no need to prepare the ECU for each input processing logic, reducing the number of parts.

11 Claims, 4 Drawing Sheets

(56) References Cited

U.S. PATENT DOCUMENTS

2004/0217649 A1* 11/2004 Rouleau ............... B60R 16/027
                                                        307/10.1
2011/0037323 A1*  2/2011 Buerer ............... G05B 19/0423
                                                        307/113
2016/0366336 A1* 12/2016 Kuehnle ............ H04N 5/23238

FOREIGN PATENT DOCUMENTS

| JP | 2016-013649 A | 1/2016 |
| JP | 2017-114228 A | 6/2017 |

OTHER PUBLICATIONS

Mitsuiwa, Y., "GCC Embedding Programming part 5", Software Design, vol. 151, No. 5, 2003, pp. 236-243.

* cited by examiner

ARITHMETIC UNIT

TECHNICAL FIELD

The present invention relates to an arithmetic unit.

BACKGROUND ART

For example, in a vehicle, various loads such as a lamp, an electric motor, and a heater, and switches for manipulating these loads are arranged in a state where they are distributed at various places of the vehicle body. Therefore, it has been conceived that a plurality of ECUs (arithmetic devices) that can communicate with each other is arranged at various places of the vehicle body, and these ECUs control loads or switches (see Patent Documents 1 and 2).

The above-mentioned ECU differs depending on types of switch to be connected (alternate switch, momentary switch, sensor input switch, and the like). The input processing logic also differs depending on types of operation to detect (short press, long press, fast press etc.) even for switches of the same type.

However, conventionally, a plurality of types of ECUs having input processing logic corresponding to the type of switch and the type of operation to detect was prepared and the ECU that was applied to switches to be connected among a plurality of types was installed. For this reason, there posed a problem that a software product number of the ECU increases.

PATENT DOCUMENT

Patent Document 1: Japanese Patent Application Laid-Open No. 2017-114228
Patent Document 2: Japanese Patent Application Laid-Open No. 2016-13649

Disclosure of the Invention

The present invention has been made in view of the above background, and an object of the present invention is to provide an arithmetic device aimed at reducing a software product number.

Problems to be Solved by the Invention

An arithmetic device which is an aspect of the present invention is an arithmetic device which executes input processing of a switch, and includes a storage unit in which a plurality of types of input processing logics is stored, a selection unit configured to select one of the plurality of types of input processing logics and an arithmetic unit configured to execute the input processing of the switch according to the input processing logic selected by the selection unit.

Preferably, the device further includes a communication unit communicable with an external device, and the selection unit selects, based on communication with the external device, the input processing designated by the external device.

Preferably, the storage unit stores the input processing logic for detecting switching on or off of an alternate switch, and the input processing logic for detecting on or off of the alternate switch and a switching interval from switching on to switching off or from switching off to switching on of the alternate switch.

Preferably, the storage unit stores the input processing logic for detecting switching off from switching on or switching on from switching off of a momentary switch, and the input processing logic for detecting switching off from switching on or switching on from switching off of the momentary switch, and switching on for more than a specified time of the momentary switch.

Preferably, the storage unit store at least one of input processing logics, for alternate switch, for momentary switch, and for a switch that outputs pulses, a number of the pulses corresponding to an operation amount.

An input processing program which is another aspect of the present invention is an input processing program for letting an arithmetic device execute input processing of a switch, the arithmetic device includes a selection unit that selects one of a plurality of types of input processing logics stored in a storage unit, and an arithmetic unit that executes the input process of the switch according to the input processing logic selected by the selection unit.

Advantageous of the Invention

According to the above-described mode, since it is unnecessary to prepare an arithmetic unit for each input processing logic, the software part number can be reduced.

MODE FOR CARRYING OUT THE INVENTION

Figure 1:
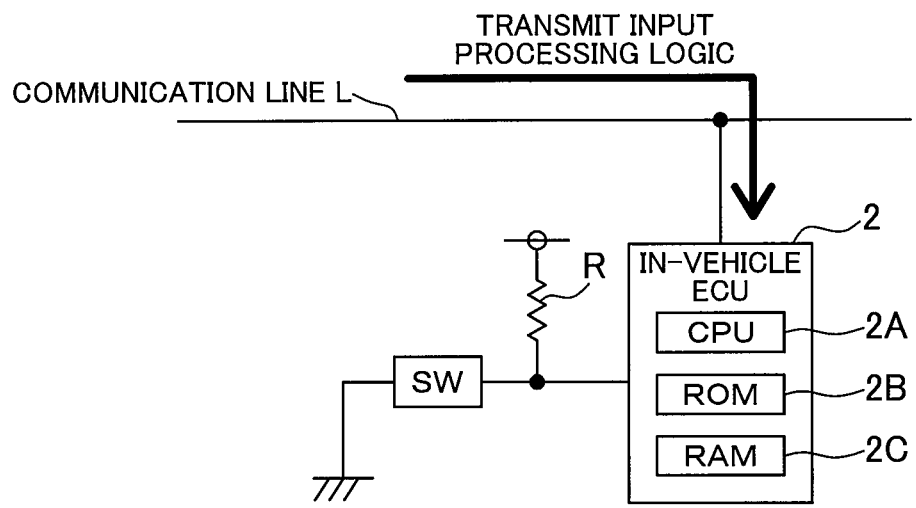
FIG. 1 is a circuit diagram showing an embodiment of an in-vehicle system incorporating an ECU as an arithmetic device of the present invention.

Hereinafter, an embodiment of the present invention will be described with reference to FIG. 1. FIG. 1 is a block diagram showing an embodiment of an in-vehicle system incorporating an in-vehicle ECU as an arithmetic device of the present invention. The in-vehicle system 1 includes switch SW and load (not shown) arranged at various locations of the vehicle body and a plurality of in-vehicle ECUs 2 connected to the switch SW and the load.

The switch SW is connected in series with the resistor R between a power supply and ground. A voltage at a connection point of a resistor R and a switch SW is input to the in-vehicle ECU 2.

A plurality of in-vehicle ECUs 2 is arranged at various locations of the vehicle body and is communicably connected to each other via a communication line L. The in-vehicle ECU 2 has a CPU 2A, a well-known microcomputer including ROM 2B and a RAM 2C. The CPU 2A performs various processing and controls for predetermined program. The ROM 2B is a read-only memory in which programs for the CPU 2A are stored. The RAM 2C stores various kinds of data and is a readable and writable memory having an area necessary for the processing work of the CPU 2A.

In the ROM 2B (storage unit) of the in-vehicle ECU 2, for example, as shown in the following Table 1, various types of input processing logics A to E are stored. CPU 2A of the in-vehicle ECU 2 (hereinafter, simply referred to as vehicle ECU 2) functions as a selecting unit and an arithmetic unit, and selects one of the plurality of input processing logics A to E and executes the selected one.

TABLE 1

| INPUT PROCESSING LOGIC | SWITCH TYPE | STATE DETECTION | EDGE DETECTION | | | | |
| --- | --- | --- | --- | --- | --- | --- | --- |
| | | | EDGE INTERVAL | FALLING | RISING | LONG PRESS | PULSE COUNT |
| A | ALTERNATE | ○ | — | — | — | — | — |
| B | ALTERNATE | ○ | ○ | — | — | — | — |
| C | MOMENTARY | — | — | ○ | — | — | — |
| D | MOMENTARY | — | — | — | ○ | ○ | — |
| E | SENSOR INPUT | — | — | — | — | — | ○ |

Figure 2:
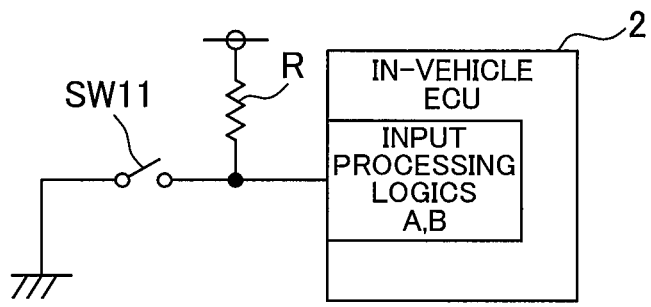
FIG. 2 is a circuit diagram when an alternate switch is connected as the switch of FIG. 1.

The input processing logics A and B are logics for an alternate switch SW 11 (FIG. 2). When the alternate switch SW 11 is turned on according to an operation, an ON state is held even if the operation is canceled, and when it is turned off according to the operation, an OFF state is held even if the operation is canceled.

Figure 3:
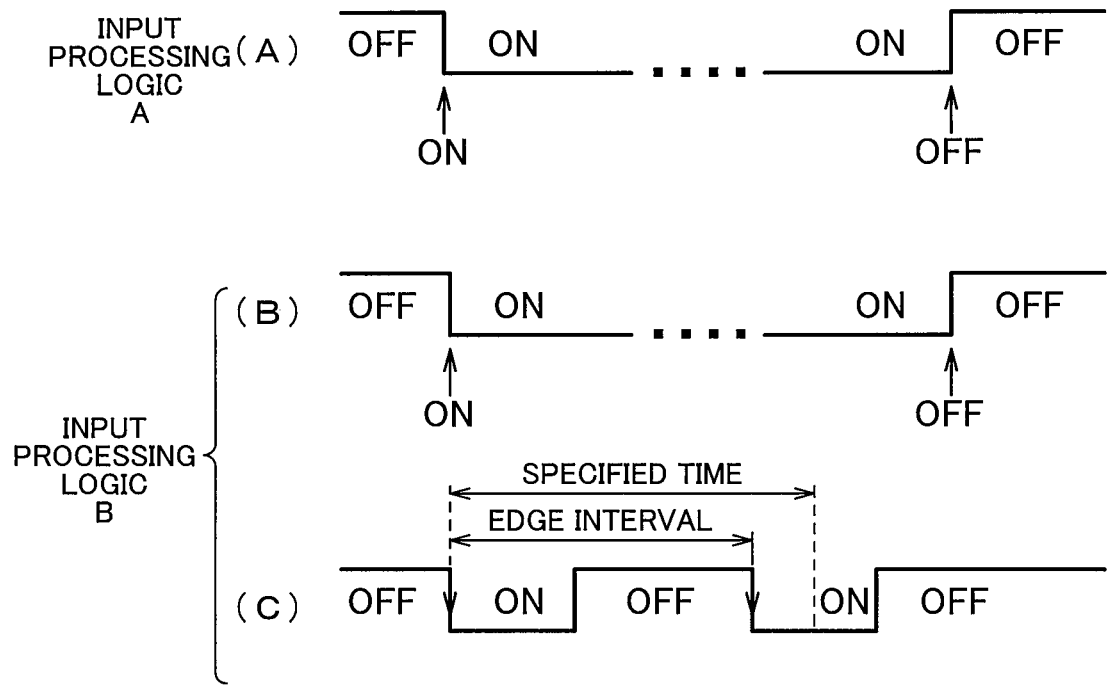
FIG. 3 is a time chart for explaining input processing logics A and B.

As shown in Table 1, the input processing logic A has the in-vehicle ECU 2 detect a state of the alternate switch SW 11, and not detect an edge interval (equal to switching interval). When the input processing logic A is selected, the in-vehicle ECU 2, as shown in FIG. 3A, executes only detection of switching ON or OFF state of the alternating switch SW 11 based on an input voltage (equal to a voltage at a connection point between the resistor R and the switch SW). That is, the on-vehicle ECU 2 detects switching OFF of the alternate switch SW 11 when the input potential is high level, and switching ON of the alternate switch SW 11 when the input level is low level.

As shown in Table 1, an input processing logic B is a logic which has the in-vehicle ECU 2 detect the state of the alternate switch SW 11 and detect the edge interval. When the logic B is selected, the in-vehicle ECU 2 executes state detection as shown in FIG. 3B. Further, as shown in FIG. 3C, the in-vehicle ECU 2 also counts edge interval which is an interval between falling edges of the input potential (the alternator switch SW 11 is switched from OFF to ON).

When the edge interval is equal to or shorter than a specified time, the in-vehicle ECU 2 detects three consecutive short presses of the alternate switch SW 11. That is, when the input processing logic B is selected, the in-vehicle ECU 2 can distinguishably detect switching ON or OFF and short press of the alternate switch SW 11. Thus, for example, in the case that the alternate switch SW 11 is an operation switch for lighting, switching on or off of the alternate switch SW 11 can turn the light on or off, controlling dimming of the light and the like for example with short press.

Figure 4:
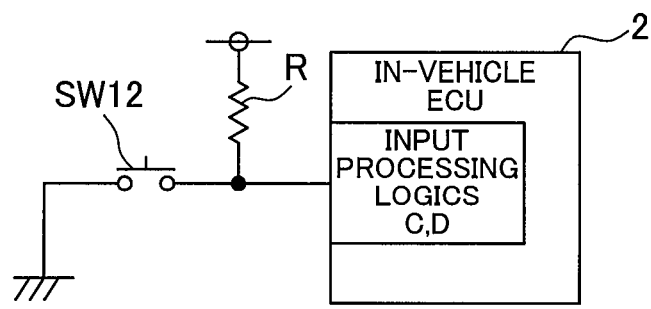
FIG. 4 is a circuit diagram when a momentary switch is connected as the switch of FIG. 1.

Input processing logics C and D are logics for a momentary switch SW 12 (FIG. 4). The momentary switch SW 12 turns on when operating, and turns off when canceling its operation.

Figure 5:
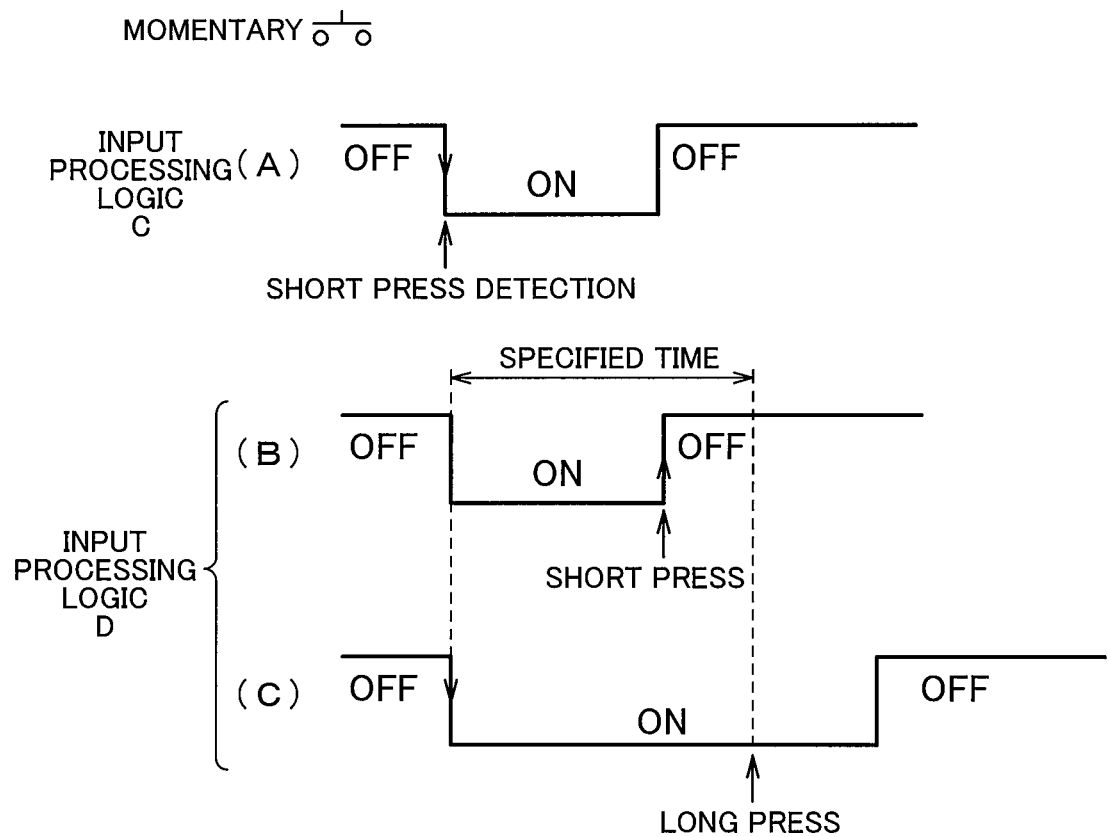
FIG. 5 is a time chart for explaining input processing logics C and D.

As shown in Table 1, the input processing logic C is a logic that has the in-vehicle ECU 2 detect a falling edge of the input potential (switching on from off of the momentary switch SW 12) and execute detection of short press of the momentary switch SW 12. When the input processing logic C is selected, the in-vehicle ECU 2, as shown in FIG. 5A, detects the falling edge of the input potential as short press of the momentary switch SW1.

As shown in Table 1, the input processing logic D is a logic that has the in-vehicle ECU 2 both detect an rising edge of the input potential (switching off from on of the momentary switch SW 12) and a long press. When the input processing logic D is selected, the in-vehicle ECU 2, as shown in FIG. 5B, counts ON time of the momentary switch SW 12 and detects the short press when a count number of ON time lies within the specified time and the rising edge of the input potential is detected. Further, as shown in FIG. 5C, the in-vehicle ECU 2 detects the long press when the count number is equal to or longer than the specified time.

Figure 6:
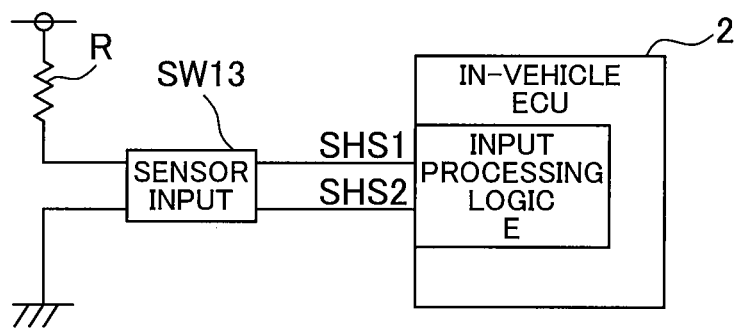
FIG. 6 is a circuit diagram when a sensor input switch is connected as the switch of FIG. 1.

An input processing logic E is a logic for a sensor input switch SW 13 (FIG. 6). The sensor input switch SW 13 is a switch that outputs a number of pulses corresponding to an operation amount, for example, a rotary encoder or the like.

Figure 7:
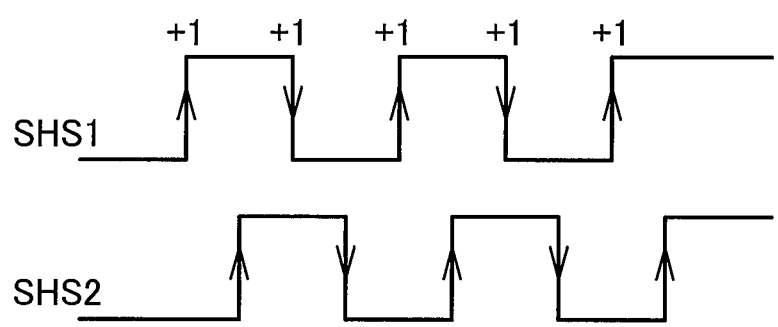
FIG. 7 is a time chart for explaining input processing logic E.

As shown in Table 1 and FIG. 7, the input processing logic E is a logic that has the in-vehicle ECU 2 count falling edge and rising edge of the input potential from the sensor input switch SW 13 (the number of pulses).

Next, the operation of the in-vehicle ECU 2 having the above-described configuration will be described below. The in-vehicle system 1 executes an initial process, for example, when an in-vehicle battery is connected and power is turned on. In the initial process, for example, the ECU 2 (external device) serving as a master transmits a signal designating one of the input processing logics A to E to the ECU 2 that is a slave, via the communication line L. The ECU 2 to be a slave which received the signal operates according to the input processing program of the present invention, and selects one designated by the signal among the plurality of input processing logics A to E stored in ROM 2B. Thereafter, in the normal process, the ECU 2 executes input processing logics A to E selected in the initial processing.

According to the embodiment described above, the plurality of types of input processing logics is stored in the ROM 2B, the CPU 2A selects one of the plurality of types of input processing logics, and performs the input processing according to the selected input processing logic. As a result, since there is no need to prepare the ECU 2 for each input processing logic, it is possible to reduce the software part number.

Further, according to the above-described embodiment, the CPU 2A selects the input processing logic designated by the master ECU 2 in communication with the ECU 2 as the master. It follows from this that it is possible to easily select the input processing logic.

According to the above-described embodiment, the ROM 2B stores the input detection processing logic for detecting whether the alternate switch SW 11 is ON or OFF, an input processing logic for detecting ON or OFF of the alternate switch SW 11 and the edge interval of the alternate switch SW 11. Thereby, since ECU 2 for storing these two types of input processing logics is not necessary to prepare separately, it is possible to reduce the software part number.

According to the above-described embodiment, the ROM 2B stores the input processing logic for detecting the falling edge of the momentary switch SW 12, and the input processing logic for detecting rising edge of the momentary switch SW 12 and ON for a predetermined time or more of the momentary switch SW 12. As a result, since the ECU 2 that separately stores these two types of input processing logics is not necessary to prepare separately, it is possible to reduce the software part number.

According to the above-described embodiment, the ROM 2B stores the input processing logic for the alternate switch SW 11, the input processing logic for the momentary switch SW 12, and the input processing logic for the sensor input switch SW 13. As a result, since the ECU 2 that stores these two input processing logics is not necessary to separately prepare, it is possible to reduce the software part number.

According to the above-described embodiment, the ECU 2 selects one of the plural types of input processing logics A to E by communication with the ECU 2 that is external device and becomes master, but is limited to this. For example, a dip switch or the like is provided in the ECU 2, and ON or OFF of the dip switch can select the input processing logics A to E.

Further, in the above-described embodiment, in the input processing logic B, the interval of the falling edges is detected, but is not limited to this. The interval of the rising edges may be detected.

Further, in the above-described embodiment, the input processing logic C detects the falling edge of the input potential, but is not limited to this. The interval of the rising edges may be detected.

Further, in the above-described embodiment, the alternate switch SW 11, the momentary switch SW 12, and the sensor input switch SW 13 are taken as the type of the switch, but is not limited to this. Any switch that needs to execute input processing may be used.

It should be noted that the present invention is not limited to the above embodiment. That is, various modifications can be made within a range that does not deviate from the gist of the present invention.

DESCRIPTIONS OF SYMBOLS

2 in-vehicle ECU (arithmetic device, external equipment)
2A CPU (selection unit, arithmetic unit)
2B ROM (storage unit)
SW switch
SW 11 alternate switch
SW 12 momentary switch
SW 13 switch that outputs pulse

The invention claimed is:

1. An arithmetic device for executing input processing of a switch, wherein the arithmetic device is configured so that one switch is connected to the arithmetic device, the arithmetic device comprising:
a storage unit in which a plurality of types of input processing logics is stored, the plurality of types of input processing logics being provided for different switch types or different switch operation types;
a selection unit configured to select one of the plurality of types of input processing logic; and
an arithmetic unit configured to execute the input processing of the switch according to the input processing logic selected by the selection unit,
wherein the plurality of types of input processing logics includes an input processing logic for detecting switching on or off of an alternate switch, and an input processing logic for detecting switching on or off of the alternate switch and a switching interval from switching on to switching off or from switching off to switching on of the alternate switch.

2. The arithmetic device according to claim 1, further comprising:
a communication unit communicable with an external device, wherein
the selection unit selects, based on communication with the external device, the one of the plurality of types of input processing logic as designated by the external device.

3. The arithmetic device according to claim 1, wherein
the plurality of types of input processing logics further includes an input processing logic for detecting switching off from switching on or switching on from switching off of a momentary switch, and an input processing logic for detecting switching off from switching on or switching on from switching off of the momentary switch, and switching on for more than a specified time of the momentary switch.

4. The arithmetic device according to claim 2, wherein
the plurality of types of input processing logics further includes an input processing logic for detecting switching off from switching on or switching on from switching off of a momentary switch, and an input processing logic for detecting switching off from switching on or switching on from switching off of the momentary switch, and switching on for more than a specified time of the momentary switch.

5. The arithmetic device according to claim 1, wherein the selection unit configured to select, based on an instruction from a hardware processor separate from both the arithmetic device and the switch, the one of the plurality of types of input processing logic.

6. The arithmetic device according to claim 5, further comprising:
a communication unit communicable with an external device comprising the hardware processor, wherein
the selection unit selects the one of the plurality of types of input processing logic based on the instruction.

7. The arithmetic device according to claim 5, wherein the arithmetic device is configured as a slave device to signals received from a master device comprising the hardware processor.

8. A non-transitory computer-readable recording medium having stored therein an input processing program which when executed causes an arithmetic device to execute input processing of a switch by the arithmetic device implementing:
a selection unit that selects one of a plurality of types of input processing logics stored in a storage unit and provided for different switch types or different switch operation types, wherein the plurality of types of input processing logics includes an input processing logic for detecting switching on or off of an alternate switch, and an input processing logic for detecting switching on or off of the alternate switch and a switching interval from switching on to switching off or from switching off to switching on of the alternate switch; and an arithmetic unit that executes the input process of the switch according to the input processing logic selected by the selection unit.

9. The non-transitory computer-readable recording medium according to claim 8, wherein the input processing program causes the arithmetic device to select, based on an instruction from a hardware processor separate from both the arithmetic device and the switch, the one of the plurality of types of input processing logics.

10. An arithmetic device for executing input processing of a switch, wherein the arithmetic device is configured so that one switch is connected to the arithmetic device, the arithmetic device comprising:
   a storage unit in which a plurality of types of input processing logics is stored, the plurality of types of input processing logics being provided for different switch types or different switch operation types;
   a selection unit configured to select one of the plurality of types of input processing logic; and
   an arithmetic unit configured to execute the input processing of the switch according to the input processing logic selected by the selection unit,
   wherein the plurality of types of input processing logics includes an input processing logic for detecting switching off from switching on or switching on from switching off of a momentary switch, and an input processing logic for detecting switching off from switching on or switching on from switching off of the momentary switch, and switching on for more than a specified time of the momentary switch.

11. A non-transitory computer-readable recording medium having stored therein an input processing program which when executed causes an arithmetic device to execute input processing of a switch by the arithmetic device implementing:
   a selection unit that selects one of a plurality of types of input processing logics stored in a storage unit and provided for different switch types or different switch operation types, wherein the plurality of types of input processing logics includes an input processing logic for detecting switching off from switching on or switching on from switching off of a momentary switch, and an input processing logic for detecting switching off from switching on or switching on from switching off of the momentary switch, and switching on for more than a specified time of the momentary switch; and
   an arithmetic unit that executes the input process of the switch according to the input processing logic selected by the selection unit.

* * * * *